UNITED STATES PATENT OFFICE.

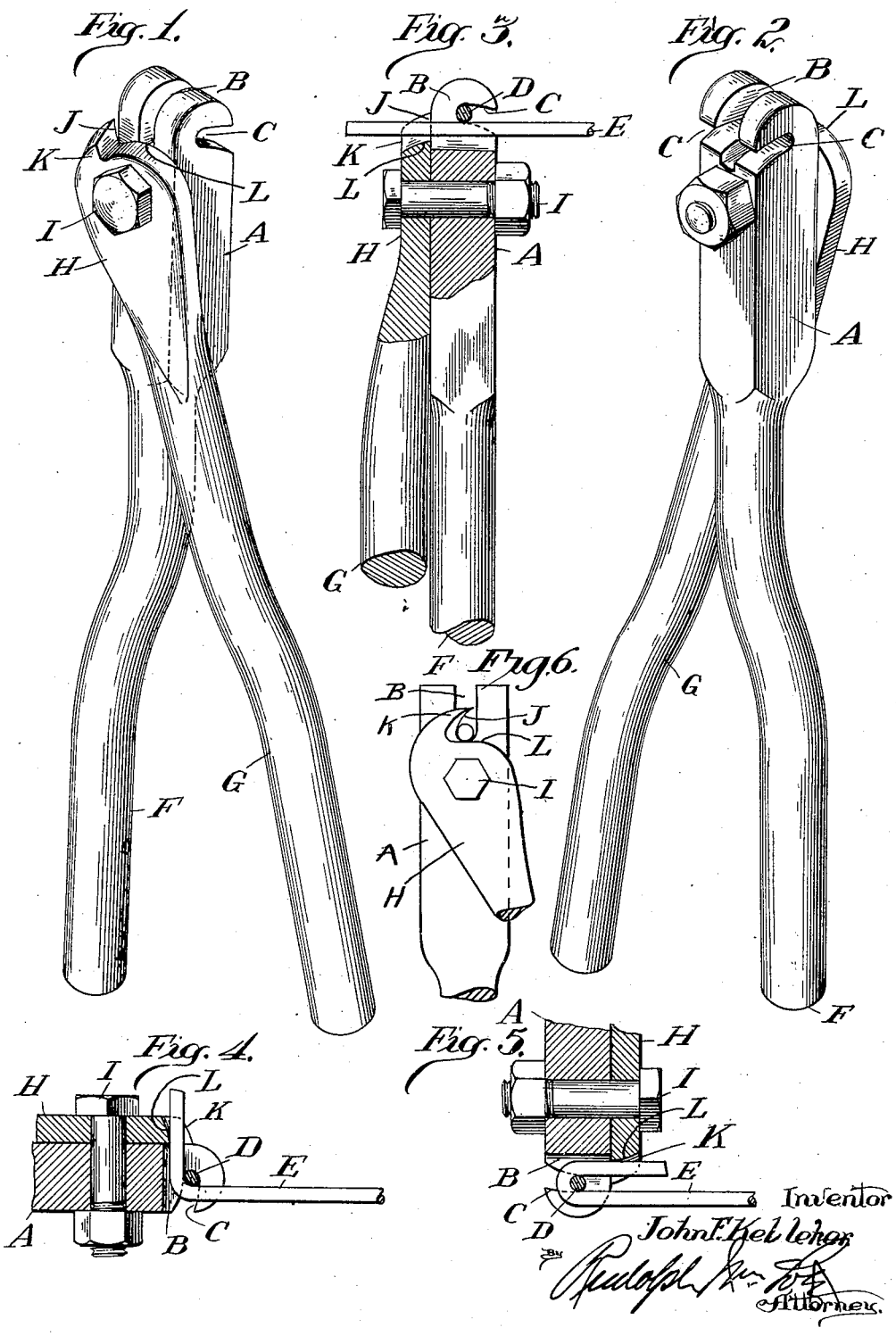

JOHN F. KELLEHER, OF LA FAYETTE, INDIANA, ASSIGNOR TO BARBEE WIRE & IRON WORKS, OF LA FAYETTE, INDIANA, A CORPORATION OF INDIANA.

WIREWORKING-TOOL.

1,321,314.  Specification of Letters Patent.  Patented Nov. 11, 1919.

Application filed October 16, 1918.  Serial No. 258,370.

*To all whom it may concern:*

Be it known that I, JOHN F. KELLEHER, citizen of the United States, residing at La Fayette, in the county of Tippecanoe and State of Indiana, have invented certain new and useful Improvements in Wireworking-Tools; and I do hereby declare the following to be a full, clear, and exact description of the invention, such as will enable others skilled in the art to which it appertains to make and use the same.

This invention has for its object to provide certain new and useful improvements in wire working tools and more particularly to provide a tool for bending one wire about another extending transversely or substantially transversely thereto as in the manufacture of wire baskets, gratings and the like, and for cutting off the superfluous ends of such wires either before bending the same about another wire or at any desired point in the movement of said tool in effecting the bending.

A further object of the invention is to provide a tool of the character defined having the minimum number of parts coacting with each other to attain the aforesaid result.

The invention consists in the features of construction and combination of parts hereinafter fully described and claimed.

In the accompanying drawings illustrating the preferred embodiment of the invention:

Figures 1 and 2 are perspective views of a wire working tool constructed in accordance with my invention.

Figs. 3, 4 and 5 are fragmentary detail central longitudinal sections of the same showing how two wires are engaged thereby and one thereof bent about the other.

Fig. 6 is a fragmentary detail view of the rear face of the device showing the parts in position to cut the wire.

My said tool comprises a member A comprising a head of rectangular cross-section provided in its outer end and midway between its side faces with a recess B. In the lower face of said head there is provided a transverse recess C which intersects the recess B substantially midway between the ends of the latter. The said recess C has slightly curved walls which converge toward the bottom thereof to accommodate wires of varying gages about which other wires are to be bent. Then as shown in Figs. 3, 4 and 5 the frame wire D of a basket or the like is received in the recess C and a wire E to be bent about the same is received in the bottom of the recess B and by then turning the member A from the position shown in Figs. 3, 4 and 5 clockwise the wire E will be bent about the wire D. The said head A is integral with an operating rod or handle F.

A companion rod or handle G terminates in a flat cutting head H which is pivotally secured to the head A by means of the bolt I or other suitable device so that upon a relative pivotal movement of the heads A and H in one direction the cutting edge J of the latter will move transversely over the recess B and the surfaces bordering the same on the side or face of the head opposite that containing the recess C. The said cutting edge J is formed in a hook-like projection K of the head H. This projection presents a concave recess having the cutting edge J which opposes one wall of the recess B with which it is adapted to coact to shear the wire. When said projection K is turned to cause its cutting edge to engage the wire, the latter is partially surrounded by said cutting edge and the outer end portion of the latter will then converge toward the opposed wall of the recess thus preventing the wire from springing away from the cutting edge toward the mouth of the recess B.

The curved edge L of the head H normally projects partly over the inner end of the recess B so that in operation the wire E abuts against the same as shown in Figs. 3, 4 and 5. Figs. 1 and 2 illustrate the relative positions of the handles F and G during the bending operation where the wire E is intended to be cut after or near completion of the bending operation. Obviously the cutting operation may precede bending or may be effected at any desired point in the bending operation depending upon whether it is desired to pass a short or a long end portion of the wire E about the wire D.

By means of my said tool wire baskets, gratings and similar structures are very quickly and neatly made.

While I have shown the preferred embodiment of the invention in the accompanying drawings it will be obvious, of course, that the same may be changed and varied in details without departing from the invention as defined in the appended claims.

I claim as my invention—

1. A wire working tool including a member having two relatively transversely disposed intersecting recesses adapted to receive transversely disposed wires and adapted to turn about one of said wires as a fulcrum to bend the other wire about the same and a lever equipped with a cutting edge pivotally mounted upon the said member, said cutting edge adapted to swing in an arc intersecting the recess adapted to receive the last-named wire and adapted to coact with one wall of said recess to shear said wire at any point in the movement of the tool about its pivotal axis.

2. A wire working tool comprising two levers pivotally secured together and equipped at one end with coacting wire cutting devices, the latter including a recess in one of said members extending parallel with the pivotal axis of the same adapted to receive a wire, there being another recess in said member extending transversely to and intersecting the first-named recess and adapted to receive a wire about which the first-mentioned wire is adapted to be bent, the second wire constituting a pivot about which the tool is adapted to turn to effect said bending, said wire cutting devices being operable to cut the first-named wire at any desired point in the pivotal movement of the tool.

JNO. F. KELLEHER.

Copies of this patent may be obtained for five cents each, by addressing the "Commissioner of Patents, Washington, D. C."